United States Patent [19]
Harrington

[11] Patent Number: 5,203,377
[45] Date of Patent: Apr. 20, 1993

[54] METHOD OF REPAIRING A PIPELINE AND APPARATUS FOR USE IN SUCH A METHOD

[75] Inventor: David R. Harrington, Upper Beaconsfield, Australia

[73] Assignee: Barry Bros. Specialised Services Pty. Ltd., Mount Waverley, Australia

[21] Appl. No.: 602,335
[22] PCT Filed: Apr. 9, 1990
[86] PCT No.: PCT/AU90/00137
  § 371 Date: Feb. 11, 1991
  § 102(e) Date: Feb. 11, 1991
[87] PCT Pub. No.: WO90/12243
  PCT Pub. Date: Oct. 18, 1990

[30] Foreign Application Priority Data
  Apr. 7, 1989 [AU] Australia ............... PJ3570

[51] Int. Cl.$^5$ ............................. F16L 55/16
[52] U.S. Cl. ......................... 138/97; 138/98; 405/154; 405/150.1; 156/287
[58] Field of Search .............. 138/97, 98, 93; 156/287; 264/269, 36; 405/150, 154

[56] References Cited
U.S. PATENT DOCUMENTS

| | | | |
|---|---|---|---|
| 2,324,520 | 7/1943 | Lamson | 138/93 |
| 3,669,099 | 6/1972 | Silverman | 156/287 |
| 4,770,562 | 9/1988 | Müller et al. | 156/287 |
| 4,778,553 | 10/1988 | Wood | 138/98 |
| 4,980,116 | 12/1990 | Driver | 156/287 |
| 5,052,445 | 10/1991 | Berchem | 138/93 |

Primary Examiner—James E. Bryant, III
Attorney, Agent, or Firm—Ernest V. Linek; Robert F. O'Connell

[57] ABSTRACT

A method of repairing a pipeline and apparatus for use in such a method is disclosed where a sheet like repair material is set in position within the pipeline with the use of a settable substance, the repair material being carried into the pipeline on a core member (4) that carries an inflatable member, the inflatable member (1) extending axially along the core member (4) and at least partially around the core member (4) to define an annular or part annular enclosed space (9, 10) extending along the core member (4), means (8, 11) being provided to inflate or deflate the inflatable member when in position in the pipeline, the inflatable member further having an outer flexible surface portion fixed only at one axial end to the core member, the inflatable member (1) acting when inflated to press the repair material against the pipeline wall to be repaired with the inflatable member (1) being thereafter deflated with the apparatus being withdrawn from the pipeline in a direction whereby the outer wall portion of the inflatable member (1) is progressively everted and peeled away from the repair material.

15 Claims, 2 Drawing Sheets

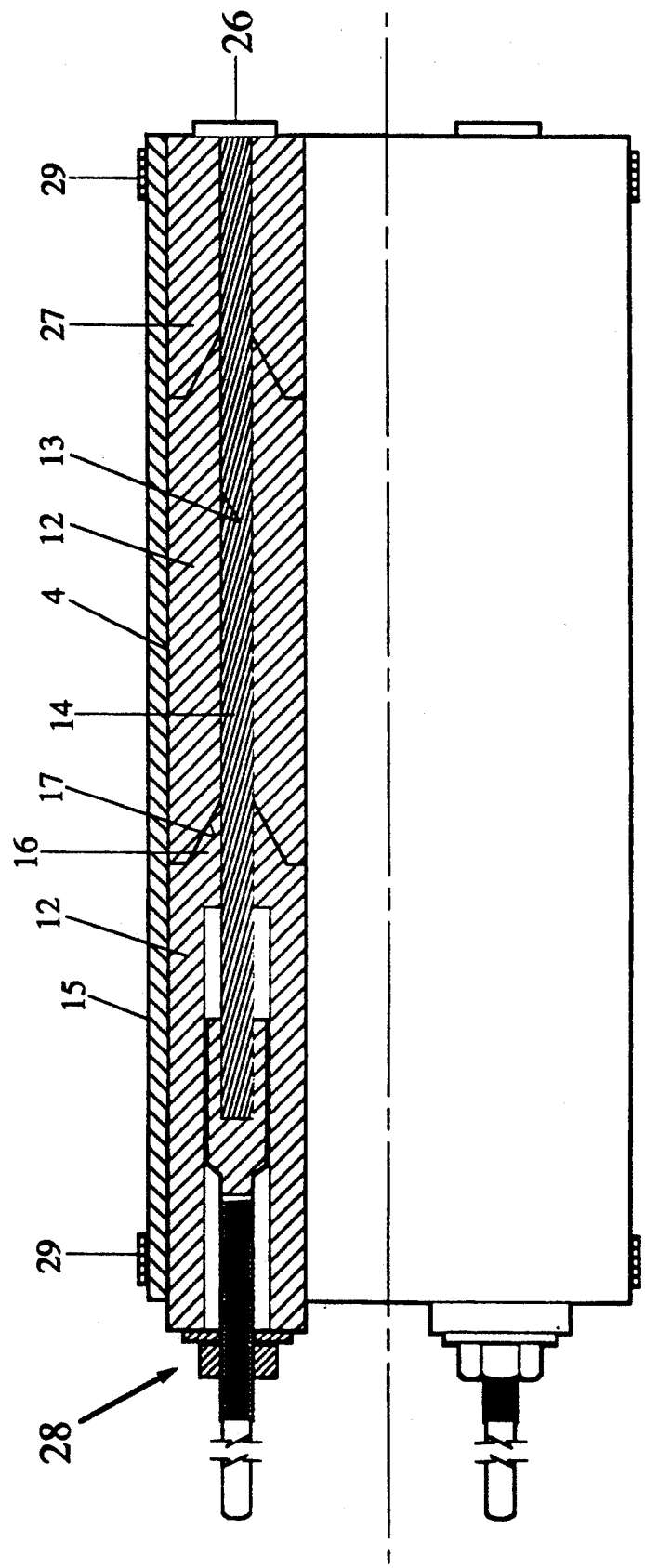

METHOD OF REPAIRING A PIPELINE AND APPARATUS FOR USE IN SUCH A METHOD

FIELD OF THE INVENTION

This invention relates to the process of refurbishing damaged conduits, pipelines and sewer pipes through the application of a reinforced lining to their inner walls by means of an inflatable form.

The refurbishment of cracked, broken or eroded pipelines or sewer pipes through so-called soft lining methods involving the application of a reinforced lining to their inner walls is well known in the art. Two principal methods are employed the inversion of a tube of thermosetting resin-impregnated reinforcement fabric into a section to be relined from an external position by means of a head of water, and the application of a layer of thermosetting resin-impregnated reinforcement material to the inner walls of a section to be relined by means of a form inflatable by air or water pressure. In both cases, curing of the thermosetting resin may be accelerated by circulation of hot water, air or steam through said inflatable form.

A shortcoming exists in the second method described in which an inflatable form is employed in that, particularly with repeated use, the external material of the form may develop an affinity for the resins employed in the relining process and may thus bond to the new lining This renders difficult the stripping and removal of the form after curing of the resin. Additionally, the arrangement of some inflatable forms is such that an even distribution of hot water or other inflation medium cannot be achieved through their internal spaces during the curing process The result is that some parts of the new lining remain uncured at the end of the normal process time A further shortcoming of known systems is that the inflatable forms employed completely fill a pipeline or sewer pipe during the relining process, interrupting all flow Bypassing of the section being refurbished is thus often a necessity Inflatable forms which embody a coaxial duct capable of sustaining a flow through a section of pipeline or sewer pipe whilst it is being refurbished are known in the art. However, rigid coaxial ducts are employed making the forms likewise rigid and thus difficult to insert into a pipeline or sewer pipe section from the usual access means.

SUMMARY OF THE INVENTION

The present invention aims at providing an apparatus for the refurbishment of pipelines and sewer pipes through the application of a layer of thermosetting resin-impregnated reinforcement material to their inner walls by means of an inflatable form which may be readily and reliably stripped from a refurbished section and which embodies a coaxial duct capable of sustaining a flow of water or sullage through the form whilst it is in use. Preferably the invention also may be rendered flexible or more or less rigid as circumstances dictate According to a first aspect of the present invention there is provided apparatus for applying in situ a repair material to a repair zone of an inner wall of a conduit, said apparatus comprising a core member, a radially expandable device located outwardly of said core member extending axially along said core member and at least partially circumferentially around said core member, said radially expandable device having an outer surface portion connected to said core member only at or adjacent one axial end of said outer surface portion of the radially expandable device. Conveniently, the radially expandable device comprises an inflatable element defining an annular or part annular enclosed space extending axially along said core member. Preferably the inflatable element comprises inner and outer flexible sheets connected to said core member at adjacent axial positions with the annular or part annular enclosed space being located between said inner and outer flexible sheets. In a still further preferred embodiment a flexible shroud member is arranged over and outwardly of said inflatable element, said flexible shroud member forming said outer surface portion. The arrangement of the inflatable element, preferably a tube, thus defined enables the tube, upon deflation, to be peeled away from the repair material by at least partial eversion when the form member is axially withdrawn along the pipeline without affecting the seal between the reinforcing material and the pipeline wall Conveniently the annular space is divided to form a fluid flow passage circulating at least in part along the outer surface of the tube Preferably the annular enclosed space is divided by an annular or part annular wall member secured at one end to the form member at a position between opposed ends of the flexible tube Inflating medium inlet and outlet means may be provided on either side of the dividing annular or part annular wall means. In a particularly preferred arrangement the core member is annular in construction enabling the maintenance of fluid flow through the pipeline during the repair process According to a second aspect of the present invention there is provided apparatus for use in the repair of pipelines by the application of reinforcement material impregnated with a settable resin to an inner wall of the pipeline, said apparatus including a core member and an inflatable member secured to an outer surface of the core member, said core member being formed by a plurality of annular sections, each said annular section having end formations adapted to engage with end formations of an adjacent said section when axially pressed together to maintain a rigid annular shape for said core member, and means to selectably press said end formations into engagement or release said end formations from engagement Conveniently when the end formations are released, the core member can be flexed to allow passage through curved pipe lengths.

According to a still further aspect, a method of repairing pipelines is provided according to the present invention, said method comprising providing a core member with a radially expandable device located outwardly of said core member, said radially expandable device extending axially along said core member and at least partly circumferentially around said core member, said radially expandable device having an outer surface portion connected to said core member only at or adjacent one axial end of said outer surface portion of the radially expandable device, locating a repair material over said outer surface portion of the radially expandable device, positioning the core member together with said repair material into the conduit to be repaired so that said repair material overlies a zone of said conduit to be repaired, expanding said radially expandable device so as to press the repair material including a settable substance against the zone of the conduit to be repaired, holding the expanded condition of said radially expandable device for a length of time sufficient for said repair material to remain adhered to said conduit to be repaired, and contracting said radially expandable device and withdrawing said core member from said conduit in a manner whereby the outer surface portion of the radially expandable member is peeled from said repair material by at least partial eversion. Conveniently the core member is withdrawn from said conduit by moving the core member along the conduit in a direction towards an axial end of said outer surface portion opposite to said one end connected to the core member.

BRIEF DESCRIPTION OF THE DRAWINGS

Various preferred aspects of the present invention will be more readily understood by reference to the following description of preferred embodiments given in relation to the accompanying drawings in which:

FIG. 2 is a longitudinal cross sectional view of part of the coaxial duct of a form.

DETAILED DESCRIPTION OF THE PREFERRED EMBODIMENTS

Figure 1:
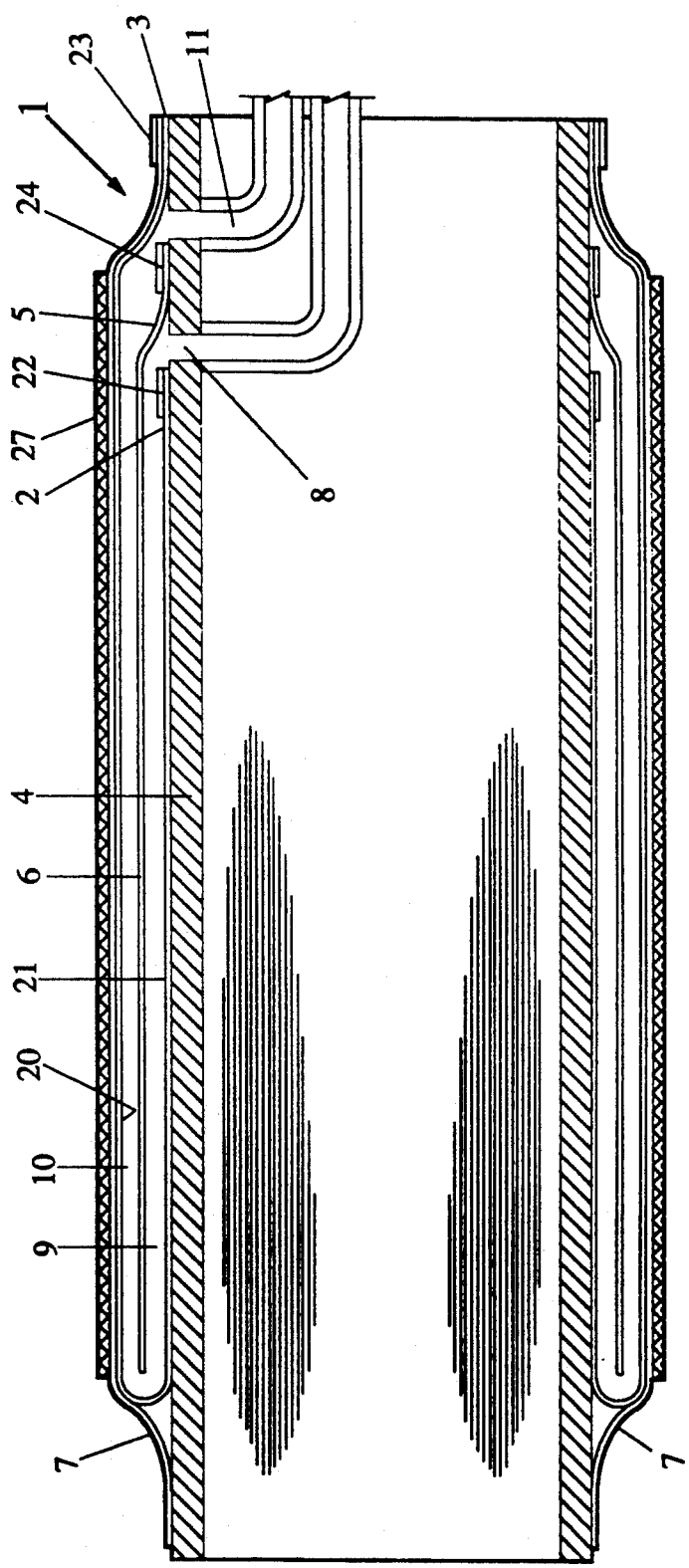
FIG. 1 is a longitudinal cross sectional view of one side of an inflatable form.
Figure 1A:
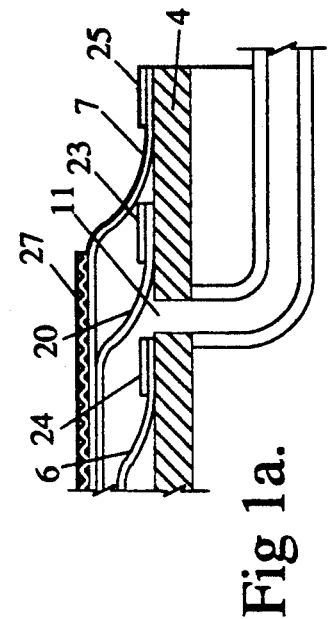
FIG. 1a is a partial cross-sectional view showing an alternative embodiment of FIG. 1.

With reference to FIG. 1, an inflatable form 1 is made by partially everting a tube of a suitably elastic material and fastening by means of bands 22 and 23 its two and 3 adjacent each other to a core member in the form of a coaxial duct 4. The end 3 of the form 1 is positioned adjacent one end of said coaxial duct. Fixed to said coaxial duct by means of a band 24 between said ends is one end 5 of a tubular director sleeve 6 which extends axially substantially throughout the length of said inflatable form and its other end being open. Said director sleeve may be made of impervious material or may be made wholly or partly foraminous. Inlet and outlet means 8,11 are provided on either side of the sleeve 6 to enable an inflating medium to be delivered and withdrawn from the form 1. Fastened coaxially to end 3 of said tube by band 23 as shown in FIG. 1 or to a point on said coaxial duct axially beyond the position of end 3 by means of a band 25 as shown in FIG. 1a if the end of said coaxial duct is extended is one end of a flexible outer shroud 7, the other end of which is free against the other end of said coaxial duct. It will of course be appreciated that the outer shroud 7 might be omitted from the embodiment illustrated and in which case the outer flexible wall 20 of the tube 1 forms the outer surface portion of the inflatable element. It is also possible when using an outer shroud 7, a simple inflatable element might be used with its axial ends connected to the duct 4 at spaced ends thereof. In operation, a tube of thermosetting resin-impregnated reinforcement material 27 is placed over ,said inflatable form and the whole assembly is introduced into the section of a pipeline or sewer pipe required to be refurbished with end 3 of said tube foremost. Correct positioning may be verified through the use of closed circuit television. An inflatation medium at a suitable temperature and pressure is then introduced through duct 8, causing said form to expand and force said resin-impregnated reinforcement material into intimate contact with the inner wall surfaces of the pipeline or sewer pipe. The flow of the inflating medium passes through the annular spaces 9 and 10 between said tubular director sleeve and the opposing inner surfaces of said form to exit through duct 11, said circulation ensuring an even temperature distribution. The inflating medium circulates at a suitable pressure and temperature is preferably continued until full curing of the resin of said resin-impregnated reinforcement material is obtained. Temperature distribution may be adjusted as required by the provision of a said tubular director sleeve provided with foramina of a number size and positioning to allow a suitable short-circuiting of the heated flow. Conveniently, the inflating medium might be water, air or some other suitable gas or fluid.

Following full curing of the thermosetting resin with which said reinforcement material is impregnated, water circulation is stopped and all water is drained or pumped from the internal spaces of said form. Said form is then slowly withdrawn from the pipeline or sewer pipe section with end 3 of said tube rearmost. This action causes said flexible outer shroud to evert and peel cleanly from said reinforcement material so that, as the form exits the section which has been refurbished, it is more or less totally everted. Said peeling action has been shown to be extremely efficient at overcoming any residual adhesion between said flexible outer skin and the resin in which said reinforcement material is impregnated.

With reference to FIG. 2, coaxial duct 4 of an inflatable form comprises a plurality of tubular elements 12 in a collinear arrangement. Each of said tubular elements is provided on one end face with a shaped, circumferential, axially extending ridge 16 and, at the other end, a complementary recess 17. When the ends of adjacent said tubular elements are abutted, said ridges and recesses register to locate said tubular elements in collinearity. Provided through the length of each of said tubular elements is one or more cable ports 13 through which a tensioning cable 14 passes from one end of said coaxial duct to the other. Said tensioning cable is fixed at a 26 to a terminal member 27 at one end of said coaxial duct and is provided at the other end with screw mechanism 28 or other suitable means by which said tensioning cable may be tensioned. When said tensioning cable is tensioned, said tubular elements are held in rigid alignment with their adjacent said complementary circumferential ridges and recesses registering in a way which ensures their collinearity. Extending throughout the length of said coaxial duct is outer jacket 15 of some suitably flexible material which is fastened by bands 29 and conveniently sealed at each end to a respective element 12. The jacket 15 serves to seal said tubular elements together. It will of course be appreciated that the jacket 15 is necessary when a simple inflatable member is used so that the inflating medium does not escape inwardly of the elements 12. With the inflatable element as shown in FIG. 1, the jacket 15 might be omitted.

In operation, prior to the positioning of an inflatable form and resin-impregnated reinforcement material in a pipeline or sewer pipe, said tensioning cable or cables are loosened allowing individual members of said tubular elements to move relative to one another, thus rendering both said inflatable form and reinforcement material in position in said pipeline or sewer pipe, said tensioning cable or cables are tensioned, rendering said coaxial duct and said inflatable form rigid in the manner aforesaid.

What is claimed is:

1. A method of repairing a conduit comprising providing a core member with a radially expandable device located outwardly of said core member, said radially expandable device extending axially along said core member, and at least partly circumferentially around said core member, said radially expandable device having an outer surface portion connected to said core member only at or adjacent one axial end of said outer surface portion of the radially expandable device, locating a repair material over said outer surface portion of the radially expandable device, positioning the core member together with said repair material into the conduit to be repaired so that said repair material overlies a zone of said conduit to be repaired, expanding said radially expandable device so as to press the repair material including a settable substance against the zone of the conduit to be repaired, holding the expanded condition of said radially expandable device for a length of time sufficient for said repair material to remain adhered to said conduit to be repaired, and contracting said radially expandable device and withdrawing said core member from said conduit in a manner whereby the outer surface portion of the radially expandable member is peeled from said repair material by at least partial eversion.

2. A method according to claim 1, wherein said core member is withdrawn from said conduit by moving the core member along the conduit in a direction towards an axial end of said outer surface portion opposite to said one end connected to the core member.

3. A method according to claim 1 or claim 2, wherein said radially expandable member comprises an inflatable element defining an annular or part annular enclosed space extending axially along said core member.

4. A method according to claim 3, wherein said inflatable element comprises inner and outer flexible sheets connected to said core member at adjacent axial positions with the annular or part annular enclosed space being located between said inner and outer flexible sheets, said outer sheet forming said outer surface portion.

5. A method according to claim 3, wherein said inflatable element comprises inner and outer flexible sheets connected to said core member at adjacent axial positions with the annular or part annular enclosed space being located between said inner and outer flexible sheets, said outer surface portion being formed by a flexible shroud member positioned outwardly of said sheets forming the enclosed space, said flexible shroud member being secured to said core member or said outer flexible sheet only at or axially outwardly of the connection of said outer flexible sheet to said core member.

6. A method according to claim 3, wherein a flexible shroud member is secured at only one axial end to the core member or the inflatable element at or axially beyond one axial end of the inflatable element.

7. A method according to claim 3, wherein fluid is directed into said enclosed radially expand said inflatable element.

8. Apparatus for applying in situ a repair material to a repair zone of an inner wall of a conduit, said apparatus comprising a core member, a radially expandable device located outwardly of said core member extending axially along said core member and at least partially circumferentially around said core member, said radially expandable device having an outer surface portion connected to said core member only at or adjacent one axial end of said outer surface portion of the radially expandable device.

9. Apparatus according to claim 8, wherein said radially expandable device comprises an inflatable element defining an annular or part annular enclosed space extending axially along said core member.

10. Apparatus according to claim 9, wherein said inflatable element comprises inner and outer flexible sheets connected to said core member at adjacent axial positions with the annular or part annular enclosed space being located between said inner and outer flexible sheets 11. Apparatus according to claim 10, wherein a divider partition is connected to said core member between said adjacent axial positions, said divider partition dividing said enclosed space into axial extending flow passages, fluid connection means to said enclosed space being located between said adjacent axial positions on either side of the divider partition.

12. Apparatus according to any one of claims 9 to 11, wherein a flexible shroud member is arranged over and outwardly of said inflatable element, said flexible shroud member forming said outer surface portion.

13. Apparatus according to claim 8, wherein said core member defines an axially extending passage so as to permit flow through said conduit while said apparatus is in use.

14. Apparatus according to claim 13, wherein the core member is constructed of a plurality of annular sections, each said annular section having end formations adapted to engage with end formations of an adjacent said section when axially pressed together to maintain a rigid annular shape for said core member, and means to selectably press said end formations into engagement or release said end formations from engagement.

15. Apparatus for use in situ repair of pipelines by the application of repair material impregnated with a settable substance to an inner wall of the pipeline, said apparatus including a core member and an inflatable member secured to an outer surface of the core member, said core member being formed by a plurality of annular sections, each said annular section having end formations adapted to engage with end formations of an adjacent said section when axially pressed together to maintain a rigid annular shape for said core member, and means to selectably press said end formations into engagement or release said end formations from engagement.

* * * * *